United States Patent
Grennan et al.

[11] Patent Number: 5,069,692
[45] Date of Patent: Dec. 3, 1991

[54] FULLY INTEGRATED INERT GAS AND OXIDIZER REPLENISHMENT SYSTEM

[75] Inventors: Robert Grennan; John Rice; Steven Squier, all of Rockford, Ill.

[73] Assignee: Sundstrand Corporation, Rockford, Ill.

[21] Appl. No.: 448,258

[22] Filed: Dec. 11, 1989

[51] Int. Cl.$^5$ .................... B01D 53/04; B01D 53/22
[52] U.S. Cl. ........................... 55/158; 55/316; 55/389
[58] Field of Search ............ 55/16, 25, 75, 158, 55/179, 316, 389

[56] References Cited

U.S. PATENT DOCUMENTS

| | | | |
|---|---|---|---|
| 4,508,548 | 4/1985 | Manatt | 55/158 |
| 4,681,602 | 7/1987 | Glenn et al. | 55/21 |
| 4,744,803 | 5/1988 | Knaebel | 55/25 |
| 4,832,714 | 5/1989 | Geldts | 55/158 |
| 4,863,492 | 9/1989 | Doshi et al. | 55/389 X |

*Primary Examiner*—Charles Hart
*Attorney, Agent, or Firm*—Wood, Phillips, Mason, Recktenwald & VanSanten

[57] ABSTRACT

Redundant components, and their volume and weight, used in on board gas generating systems are avoided in a fully integrated system for generating oxygen enriched air (OEA) and nitrogen enriched air (NEA) for a variety of purposes. A first separator (16) may provide OEA to a second separator (24) directly to provide oxygen for crew consumption or alternatively may provide OEA to a compressor (42) which in turn provides high pressure OEA to storage vessels (70), (72). The separator (16) also provides NEA alternatively to aircraft fuel tanks (60) for inerting them by direct flow or, after being compressed by the compressor (42) to an NEA storage system (50). NEA from the storage system (50) may additionally be used for fuel expulsion in a fuel system (96) associated with an auxiliary power unit/emergency power unit including a hot gas generator (74), the latter also receiving oxidant for the fuel in the form of OEA from one of the OEA storage tanks (72).

4 Claims, 1 Drawing Sheet

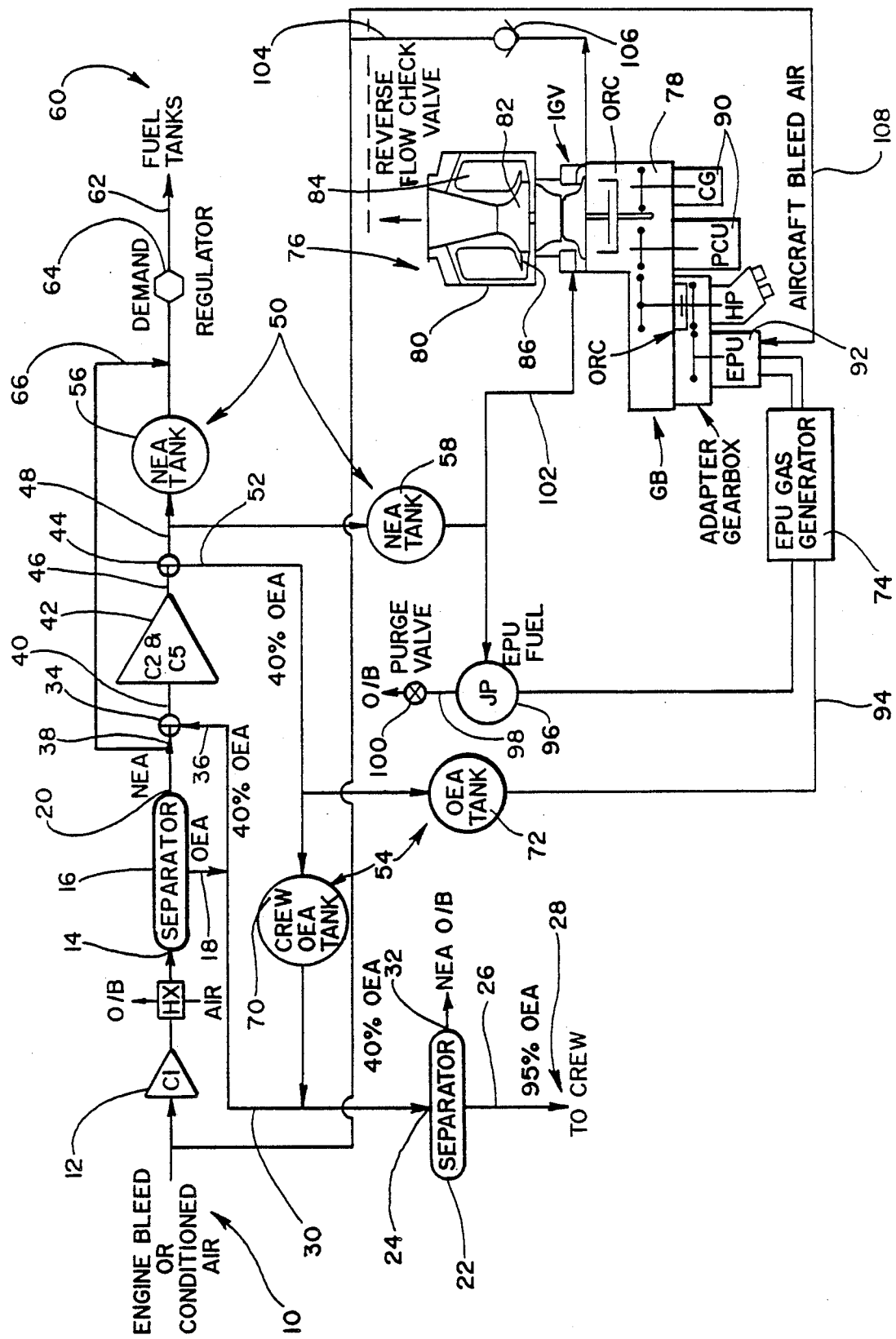

FULLY INTEGRATED INERT GAS AND OXIDIZER REPLENISHMENT SYSTEM

FIELD OF THE INVENTION

This invention relates to a fully integrated system adapted to be used on aircraft for providing on board generation of inert gas as may be used for fuel purges and the inerting of fuel tanks, the on board generation of oxygen for crew consumption, and the on board generation of oxidant and inert gas functions that may be associated with auxiliary and/or emergency power units.

BACKGROUND OF THE INVENTION

Notwithstanding the increasing sophistication of military aircraft, there is a trend toward increasingly austere basing requirements for such aircraft. It is supposed that forward bases established in recently acquired or potentially hostile territory will quite likely be devoid of the sophisticated ground support equipment that is necessary for the support of the increasingly sophisticated on board aircraft systems.

Conventionally, such systems include the provision of an inert gas such as so-called nitrogen enriched air (NEA) for use in inerting fuel tanks. As fuel is consumed in a fuel tank, the voided volume is filled with NEA to displace any oxidant that might combust with fuel vapor within the tank as a result of the plane being struck during combat or the like. Such systems also provide oxygen for crew life support.

One system that has been proposed to provide gases for the functions mentioned immediately preceding is illustrated in U.S. Pat. No. 4,681,602 issued July 21, 1987 to Glenn et al.

At the same time, there are other needs for oxygen and inert gas on aircraft and replenishment stores are not considered to be readily available at forward bases, nor are the means required to produce the requisite gases for replenishment of aircraft installed NEA or oxygen consuming units easily obtained. Consequently, distinct on board systems to meet these needs have been proposed.

These various operationally distinct systems have several disadvantages because of the number of differing systems attempting to perform similar functions, dissimilarity of the same, and complexity. Maintenance and spare costs are also high. Furthermore, the additional logistic costs associated with system consumables and ground support equipment for each distinct system enhances the problem.

In some systems, such as one wherein the use of hydrazine is employed to provide a means for rapidly starting an emergency power unit, the safety hazard that arises from handling such materials is undesirable. The independence of the various systems on board the aircraft also imposes a weight and volume penalty and because the aircraft is heavily dependent on ground support as a result, turnaround time between operations is higher, the flexibility to base the aircraft where desired is lower, and the vulnerability of the aircraft at ground attack is increased.

The present invention seeks to overcome one or more of the above problems.

SUMMARY OF THE INVENTION

It is the principal object of the invention to provide a new and improved, fully integrated system for on board disposition on an aircraft that provides for on board generation of inert gas and oxygen and/or oxygen enriched air.

An exemplary embodiment of the invention achieves the foregoing object in a fully integrated system which provides for the on board generation of inert gas for fuel tank inerting, the on board generation of oxygen for crew consumption, and the generation of oxidant and inert gas for functions that are associated with auxiliary and/or emergency power units.

The system includes a system inlet adapted to receive engine bleed air or conditioned environmental control system air available on an aircraft. A first separator is connected to the inlet to receive the bleed or conditioned air therefrom and has a nitrogen enriched air (NEA) outlet and an oxygen enriched air (OEA) outlet. A second separator has an inlet connected to the OEA outlet and a first outlet adapted to be connected to aircraft crew oxygen consuming means. A second, waste outlet is also included with the second separator. The second separator further enriches the OEA received from the first separator and directs the same to the first outlet while providing a nitrogen enriched waste stream to the second outlet. The system also includes a compressor.

A first three way valve means has inlets connected to both the NEA outlet and the OEA outlet and an outlet connected to the compressor. The three way valve means is selectively operable to direct either NEA or OEA from the first separator to the compressor to be compressed thereby. Means for storing NEA, as well as means for storing OEA, are also provided.

A second three way valve means has an inlet connected to the compressor to receive compressed gas therefrom and outlets respectively connectable to the NEA storage means and to the OEA storage means. It is selectively operable to direct highly compressed NEA or OEA to the corresponding storage means. A conduit is provided which is adapted to be connected to aircraft fuel tanks and is connected to the NEA storage means to receive NEA therefrom to provide an inert atmosphere within the aircraft fuel tanks. Also included is an NEA bypass connecting the NEA outlet of the first separator to the conduit, so that NEA received directly from the separator may be flowed directly to aircraft fuel tanks. Gas turbine engine means are included for providing auxiliary power and/or emergency power functions aboard an aircraft and include at least one turbine wheel and power generating equipment. An auxiliary combustor is provided for the gas turbine engine means and is adapted to receive OEA and fuel and combust the same to provide gases of combustion to rapidly accelerate the turbine wheel. A fuel system for the gas turbine engine means is provided and includes a fuel line connected to the auxiliary combustor. Means are provided to connect the OEA storage means to the auxiliary combustor so that stored OEA may be directed thereto under emergency conditions to rapidly start the gas turbine engine means.

As a consequence of the foregoing, a fully integrated system that meets all requirements for the use of gas on board military aircraft is provided. The number of components are minimized and in most instances, shared where possible. Because of such sharing, the overall complexity of the function is reduced substantially and a goodly number of the problems listed previously herein overcome.

In a preferred embodiment, means are provided to connect the NEA storage means to the fuel system for the auxiliary combustor and are operable to pressurize fuel storage tanks with NEA when desired so as to eliminate the need for an additional fuel pump to pump fuel from the tanks.

In a highly preferred embodiment, the NEA storage means comprises separate first and second NEA storage vessels. One is connected to the conduit for ultimate connection to the fuel tanks and the other is connected to the auxiliary/emergency combustor fuel system.

The invention also contemplates that the OEA storage means comprise separate first and second OEA storage vessels, one connected to the second separator inlet, and the other connected to the auxiliary combustor.

Other objects and advantages will become apparent from the following specification taken in connection with the accompanying drawings.

DESCRIPTION OF THE DRAWINGS

The figure is a schematic of a fully integrated on board gas generating system made according to the invention.

DESCRIPTION OF THE PREFERRED EMBODIMENT

An exemplary embodiment of a gas generating system made according to the invention is illustrated in the drawing and with reference to the Fig. is seen to include an inlet, generally designated 10. The inlet 10 may be connected to the aircraft main engine bleed air source or, if desired, to the environmental control system typically on board such aircraft to receive conditioned air therefrom.

The incoming air is first fed to a compressor 12 to have its pressure elevated. The same is then placed on the inlet 14 of a membrane type separator 16. The separator 16 is conventional and has a first outlet 18 through which oxygen enriched air (OEA) is expelled. Also included is a second outlet 20 through which nitrogen enriched air (NEA) is likewise expelled.

The system includes a second separator 22 which has an inlet 24 connected to the OEA outlet 18 of the first separator 16. Thus, the second separator, which preferably is a molecular sieve type of separator of conventional construction, is operable to receive OEA and provide an even further enriched OEA stream on an outlet 26 which in turn may be directed to suitable equipment to provide life support oxygen for the crew. In the usual case, a line 30 interconnecting the outlet 18 and the inlet 24 will contain 40% OEA, whereas 95% OEA will be emitted from the outlet 26 of the separator 22.

The separator 22 also includes an outlet 32 for a waste stream which will be nitrogen enriched air waste stream.

The system includes a first three way valve 34 having an inlet 36 connected to the OEA outlet of the first separator 16 and a second inlet 38 connected to the NEA outlet 20 of the first separator 16. The first three way valve also has an outlet 40 which is connected to a dual function recharge compressor 42.

The arrangement is such that the valve 34 may be selectively operated to pass the OEA stream from the outlet 18 to the compressor 42 to have its pressure elevated, or to pass the NEA stream from the outlet 20 to the compressor 42 to have its pressure elevated.

A second three way valve 44 has an inlet 46 connected to the outlet of the compressor 42, that is, the high pressure side of the compressor 42. A first outlet 48 from the second three way valve 44 extends to an NEA storage means, generally designated 50. A second outlet 52 from the valve 44 extends to an OEA storage means, generally designated 54. The arrangement is such that the second three way valve 44 may be selectively operated to direct high pressure NEA to the NEA storage means 50, or high pressure OEA to the OEA storage means 54.

The NEA storage means 50 is in turn made up of first and second NEA storage vessels 56 and 58. The storage vessel 56 is adapted to be connected to the fuel tanks 60 of the aircraft via a conduit 62 containing a demand regulator 64 in a conventional fashion. Thus, NEA stored in the vessel 56 may be directed to the fuel tanks 60 to inert the same.

In some instances, on demand inerting may be desirable and accordingly, a bypass line 66 extends from the NEA outlet 20 of the first separator 16 to the input side of the demand regulator 64, so that NEA from the separator 16 may be directly fed to the fuel tanks 60 if desired.

The OEA storage means 54 is made up of first and second OEA storage vessels 70 and 72, respectively. The storage vessel 70 is connected to the inlet 24 of the separator 22 to provide 40% OEA thereto when 40% OEA is not being taken from the outlet 18 and there is a demand for oxygen.

The second OEA vessel 72 is connected to a hot gas generator 74 which is in fact an auxiliary combustor of a gas turbine engine system, generally designated 76. The gas turbine engine system 76 may be an auxiliary power unit (APU) or an emergency power unit (EPU) or have aspects of both. Typically, the same will have a transmission shown schematically at 78 which may be driven by a gas turbine engine 80 having a turbine wheel 82. An annular combustor 84 provides hot gases of combustion through a nozzle 86 to drive the turbine wheel 82.

The transmission 78 in turn uses the rotary power to drive power generating devices shown schematically at 90 which may include hydraulic pumps, electrical generators, or the like.

Also connected to the transmission 76 is an EPU turbine wheel 92 which can receive hot gases of combustion from the hot gas generator 74 and rapidly accelerate the system to the point where the gas turbine 80 is in self-sustaining operation to provide for the generation of power. In some instances, the EPU 92 may be dispensed with in favor of connecting the hot gas generator 74 directly to the nozzle 86 or at least to a similar nozzle that is operable to drive the turbine wheel 82.

Oxidant for fuel to be burned in the hot gas generator 74 is provided via a line 94 extending from the second OEA vessel 72. Fuel is provided from a separate fuel tank 96 that is provided with an overboard purge system 98 including a purge valve 100.

The second NEA vessel 58 is connected to the fuel system 96 and may be utilized to pressurize the fuel storage tank 96 with inert gas. This allows fuel to be expelled from the tank 96 by gas pressure and eliminates any need for a fuel pump for the purpose. The NEA tank 58 may also be connected via a line 102 to the gas turbine engine system 76. High pressure NEA may be applied against vaned rotary components in the gas turbine engine 80, typically the turbine wheel 82, to accelerate the same so that the effect of an air turbine starter is provided using NEA.

A bleed air line 104 including a check valve 106 may also be utilized to provide bleed air from the APU to the input of the compressor 12 when desired. Alternatively, bleed air from the main engines may be fed along the same line but blocked from entering the gas turbine engine 80 by the check valve 106 to a branch line 108 to the EPU to act as an air turbine starter.

From the foregoing, it will be seen that the invention provides a fully integrated system for the on board generation of oxygen and inert gas, both being used for multiple purposes. System complexity to provide a means for producing inert gas or OEA for all of the purposes employed is clearly reduced, since so many components provide multiple functions. This in turn reduces both weight and volume and makes it possible to employ such a system on an aircraft which in turn minimizes ground support requirements at forward bases.

We claim:

1. A fully integrated system for on board disposition on an aircraft for providing on board generation of inert gas, on board generation of oxygen, and on board generation of oxidant and inert gas for functions of auxiliary and/or emergency power units and comprising:
   a system inlet adapted to receive engine bleed air or conditioned environmental control system air available on an aircraft;
   a first separator connected to said inlet to receive said bleed or conditioned air therefrom and having a nitrogen enriched air (NEA) outlet and an oxygen enriched air (OEA) outlet;
   a second separator having an inlet connected to said OEA outlet and a first outlet adapted to be connected to aircraft crew oxygen consuming means, and a second, waste outlet, said second separator further enriching OEA received from said first separator and directing the same to said first outlet while providing a nitrogen enriched waste stream to said second outlet;
   a compressor;
   a first three way valve means having inlets connected to both said NEA outlet and said OEA outlet and an outlet connected to said compressor and being selectively operable to direct either NEA or OEA from said first separator to said compressor to be compressed thereby;
   NEA storage means;
   OEA storage means;
   second three way valve means having an inlet connected to said compressor to receive compressed gas therefrom and outlets respectively connectable to said NEA storage means and to said OEA storage means, and selectively operable to direct compressed NEA or OEA to the corresponding storage means;
   a conduit adapted to be connected to aircraft fuel tanks and connected to said NEA storage means to receive NEA therefrom to provide an inert atmosphere within the aircraft fuel tanks;
   an NEA bypass connecting said NEA outlet to said conduit so that NEA received directly from said separator may be flowed to aircraft fuel tanks;
   gas turbine engine means for providing for auxiliary power and emergency power aboard an aircraft and including at least one turbine wheel and power generating equipment;
   an auxiliary combustor for said gas turbine engine means and adapted to receive OEA and fuel and combust the same to provide gases of combustion to rapidly accelerate said turbine wheel;
   a fuel system including a fuel line connected to said auxiliary combustor; and
   means connecting said OEA storage means to said auxiliary combustor so that stored OEA may be directed thereto under emergency condition to rapidly start said gas turbine engine means.

2. The fully integrated system of claim 1 further including means connecting said NEA storage means to said fuel system and operable to apply pressure to fuel within the fuel system with NEA.

3. The fully integrated system of claim 2 wherein said NEA storage means comprises separate first and second NEA storage vessels, one connected to said conduit and the other connected to said fuel system.

4. The fully integrated system of claim 1 wherein said OEA storage means comprises separate first and second OEA storage vessels, one connected to said second separator inlet and the other connected to said auxiliary combustor.

* * * * *